United States Patent [19]

Kohzai et al.

[11] 4,338,535
[45] Jul. 6, 1982

[54] DIRECT CURRENT MOTOR HAVING E-SHAPED INTERPOLES

[75] Inventors: Yoshinori Kohzai, Hino; Shigeaki Oyama; Yukio Katsuzawa, both of Hachioji, all of Japan

[73] Assignee: Fujitsu Fanuc Limited, Hino, Japan

[21] Appl. No.: 129,834

[22] Filed: Mar. 13, 1980

[30] Foreign Application Priority Data

Mar. 24, 1979 [JP] Japan .................................. 54/33804

[51] Int. Cl.³ ............................................... H02K 1/10
[52] U.S. Cl. ...................................... 310/186; 310/224
[58] Field of Search ............................... 310/185–190, 310/216, 259, 223, 46, 224, 177, 226, 191, 192, 193, 254, 258; 322/64–65

[56] References Cited

U.S. PATENT DOCUMENTS

| 665,586 | 1/1901 | Siemens | 310/244 |
| 1,523,004 | 1/1925 | Doherty | 310/224 |
| 3,885,302 | 5/1975 | Boesel | 310/186 |

FOREIGN PATENT DOCUMENTS 250692 4/1964 Australia .............................. 310/186

Primary Examiner—R. Skudy
Attorney, Agent, or Firm—Armstrong, Nikaido, Marmelstein & Kubovcik

[57] ABSTRACT

A direct current motor used, for example, in a machine tool, comprising an armature, a plurality of main magnetic poles disposed around the armature having field windings wound thereon, and a plurality of E-shaped interpoles disposed at the intermediate position along the outer circumference of said armature between the adjacent main magnetic poles, each of the E-shaped interpoles consisting of a center pole to which an interpole winding is wound and two side poles, and the width of the gap between the outer circumference of the armature and the end surface of each of the side poles increases from the portion of the gap which is remote from the center pole to the portion of the gap which is adjacent to the center pole.

In the DC motor according to the present invention, the linearity of the magnetic flux used for commutation is ensured in a wide range of the armature current, and, therefore, commutating characteristics of the E-shaped interpoles is improved.

3 Claims, 6 Drawing Figures

DIRECT CURRENT MOTOR HAVING E-SHAPED INTERPOLES

TECHNICAL FIELD

The present invention relates to a direct current motor having E-shaped interpoles, more particularly to a direct current electric motor having E-shaped interpoles used, for example, in a machine tool.

BACKGROUND OF THE INVENTION

In general, a DC motor comprises a plurality of interpoles in order to improve the commutating characteristics of the DC motor. The interpoles are disposed at the intermediate position along the outer circumference of an armature between the adjacent main magnetic poles, and face the armature windings existing in commutating zones. The interpoles are interlinked by a magnetic field produced by the armature reactions, and accordingly the interpoles are necessary to produce a magnetomotive force to eliminate the magnetic field produced by the armature reactions, in addition to a magnetomotive force to produce a magnetic field needed for commutation.

In order to reduce the magnetomotive force produced by the interpoles and to improve various operating characteristics of the DC motor, a DC motor having E-shaped interpoles has been proposed in, for example, the Japanese Patent Application Laid Open No. 53-126107 corresponding to U.S. patent application Ser. No. 884,586, now U.S. Pat. No. 4,220,882 by the applicant of the present invention.

With reference to the accompanying FIG. 1, a prior art DC motor having the E-shaped interpoles disclosed in the above-mentioned patent application will be explained. The DC motor in FIG. 1 comprises an armature 1, a cylindrical shaped yoke 7 and two main magnetic poles 3 and 4 equidistantly spaced around the outer circumference of the armature 1 having a small gap therebetween and attached to the inner circumference of the yoke 7. The main magnetic poles 3 and 4 have field windings 5 and 6 wound thereon respectively. The field windings 5 and 6 are supplied with electric current in a predetermined direction so that the polarities of the main magnetic poles 3 and 4 are selected to be, for example, N and S, respectively. As a result, the armature 1 is counter clockwisely rotated as shown by arrow a. In this case, some of the armature windings 21, 22 and 23, 24, which are located between the main magnetic poles 3 and 4, are within commutating zones.

In order to eliminate the counter electromotive force induced in the armature windings 21 through 24 within commutating zones, the E-shaped interpoles 8 and 9 are attached to the inner circumference of the yoke 7 by using spacers 25 and 26 made of non-magnetic material, and are located at the intermediate positions along the outer circumference of the armature 1 between the main magnetic poles 3 and 4. The interpole 8 comprises a center pole 81 having an interpole winding 10 wound thereon, and two side poles 82 and 83 disposed respectively in front of and to the rear of the center pole 81 along the direction of the rotation of the armature 1. The interpole winding 10 is connected in series with the armature windings 2, and an armature current passes through the interpole winding 10 in such a direction so that the polarity of the center pole 81 becomes S and the polarity of the side poles 82 and 83 becomes N. The other interpole 9 also comprises a center pole 91 having an interpole winding 11 wound thereon, and two side poles 92 and 93. The interpole winding 11 is also connected in series with the armature windings 2, and the direction of the armature current passing through the interpole winding 11 is selected so that the polarity of the center pole 91 becomes N and the polarity of the side poles 92 and 93 becomes S.

The E-shaped interpoles 8 and 9 are hardly affected by the magnetic field produced by the armature reactions. This is ecause the magnetic flux caused by the whole of the armature current flowing through the armature windings 2 hardly penetrates the interpoles 8 and 9 due to the existence of the spacers 25 and 26 of non-magnetic material. For example, in the interpole 8, only the magnetic flux $f_1$ and $f_2$, which are caused by the current passing through the armature windings 21 and 22 within a commutating zone, pass through the magnetic circuit including the center pole 81, side poles 82 and 83 of the interpole 8 and the armature 1. Thus, the amount of the magnetomotive force produced by the E-shaped interpoles 8 and 9 can be greatly reduced, and therefore, the cross sectional area of the interpole winding can be very small and the heat generated by the interpoles can be reduced.

It should be noted that the amount of the magnetic flux produced by the interpole winding is desirable to be linear to the amount of the current flowing through the interpole winding, and if the linearity of the amount of the magnetic flux is not guaranteed in the wide range of the interpole current, the interpole cannot effectively perform its function of eliminating the armature reaction and producing the magnetic flux for commutation.

FIG. 2 shows the conventional E-shaped interpole used in the conventional DC motor of FIG. 1, and FIG. 4A shows a relation between the magnetic flux for commutation and the armature current. In the conventional E-shaped interpole of FIG. 2, among a plurality of teeth of the armature 1 which face the end surfaces of the side poles 82 and 83 of the interpole 8, the teeth, which are nearer to the center pole 81 of the interpole 8, become magnetically saturated easily with a smaller armature current than the other teeth. Therefore, it is impossible to supply a sufficiently large current to the interpole winding, and the linearity of the magnetic flux with the armature current cannot be obtained in the wide range of the armature current.

The reason why the above-mentioned linearity cannot be obtained in a wide range will be explained in more detail. In the magnetic circuit composed of the E-shaped interpole 8 and the armature 1 as shown in FIG. 2, the magnetic flux produced by the armature windings which face the E-shaped interpole 8 is added to the magnetic flux produced by the interpole winding 10 in an opposite direction. The magnetic flux produced by the interpole winding 10 is larger than that produced by the armature windings facing the E-shaped interpole 8, and consequently the magnetic flux for commutation is produced in the same direction as that of the magnetic flux produced by the interpole winding 10, as shown by arrows in FIG. 2. This magnetic flux for commutation passes the magnetic circuit composed of the E-shaped interpole 8 and the armature 1 from the center pole 81 through both side poles 82, 83 and the armature 1 to the center pole 81 again. In this case, the magnetic flux for commutation passes the above-mentioned magnetic circuit separately into the left half and the right half thereof. Half of the magnetic flux for commutation which passes, for example, the right half of the above-mentioned magnetic circuit is composed of the magnetic flux $f_A$ which passes the magnetic circuit $P_A$ including the tooth A of the armature 1 and the side pole 83 and the center pole 81 of the E-shaped interpole 8, and the magnetic flux $f_B$ which passes the magnetic circuit $P_B$ including the tooth B of the armature 1 and the side pole 83 and the center pole 81 of the E-shaped interpole 8. It should be noted that the tooth A faces the portion of the end surface of the side pole 83 which is adjacent to the center pole 81, and the tooth B faces the portion of the end surface of the side pole 83 which is remote from the center pole 81. As mentioned above, the amount of the magnetic flux for commutation is determined by the difference between the amount of the magnetic flux produced by the interpole winding 10 and the amount of the magnetic flux produced by the armature windings 2 facing the E-shaped interpole 8. Since the number of the armature windings 2 which interlink with the magnetic circuit $P_A$ is smaller than the number of the armature windings 2 which interlink with the magnetic circuit $P_B$, the amount of the magnetic flux which passes through the magnetic circuit $P_B$ and produced by the armature windings 2 is larger than the amount of the magnetic flux which passes through the magnetic circuit $P_A$ and produced by the armature windings 2. Therefore, the amount of the magnetic flux $f_A$ is larger than the amount of the magnetic flux $f_B$, and the magnetic flux density in the tooth A is larger than that in the tooth B. As shown in FIG. 4A, the amounts of the magnetic flux $f_A$ and $f_B$ increase according to the increase of the armature current $I_a$, i.e. interpole current, and the tooth A is magnetically saturated prior to the magnetical saturation of the tooth B. To this end, the linearity of the total magnetic flux $f_A + f_B$ is lost in accordance with the saturation of the magnetic flux $f_A$, as shown by the bold line of FIG. 4A. As a result, the linearity of the amount of the magnetic flux for commutation cannot be guaranteed in a wide enough range of the interpole current.

DISCLOSURE OF THE INVENTION

It is the principal object of the present invention to provide an improved, novel direct current motor having E-shaped interpoles in which the teeth of an armature do not saturate magnetically until a relatively high armature current, i.e. high interpole current, and the linearity of the magnetic flux used for commutation is ensured in a wide range of the armature current, whereby commutating characteristics of the E-shaped interpoles are improved and better use of the advantages of the E-shaped interpoles is achieved.

According to the present invention, there is provided a direct current motor comprising, an armature having armature windings wound thereon and rotating around the central axis thereof, a plurality of main magnetic poles disposed around said armature having field windings wound thereon, and a plurality of E-shaped interpoles disposed at the intermediate position along the outer circumference of said armature between the adjacent main magnetic poles, each of said E-shaped interpoles consisting of a center pole to which an interpole winding is wound and two side poles, characterized in that the width of the gap between the outer circumference of the armature and the end surface of each of said side poles increases from the portion which is remote from said center pole to the portion which is adjacent to said center pole.

The present invention will be more clearly understood from the following description with reference to the accompanying drawings.

DESCRIPTION OF THE PREFERRED EMBODIMENTS

Figure 1:
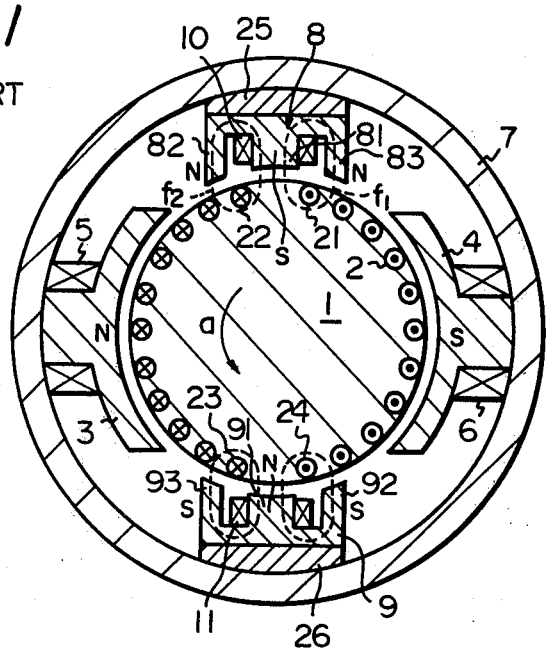
FIG. 1 is a cross sectional view illustrating a conventional direct current motor having E-shaped interpoles.
Figure 2:
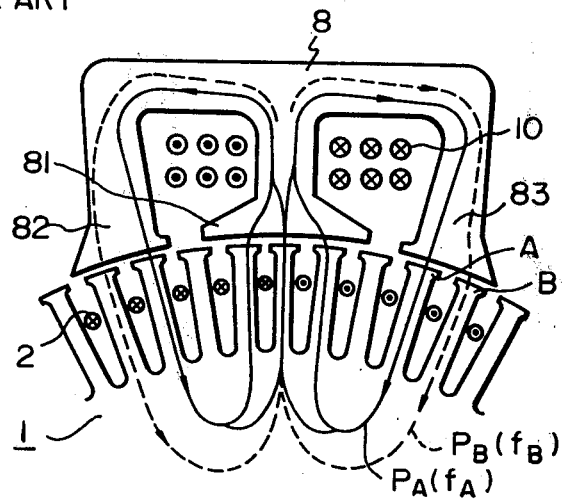
FIG. 2 is a partial cross sectional view which illustrates a part of the conventional direct current motor of FIG. 1 and is used for explaining the workings of the conventional E-shaped interpoles.
Figure 3:
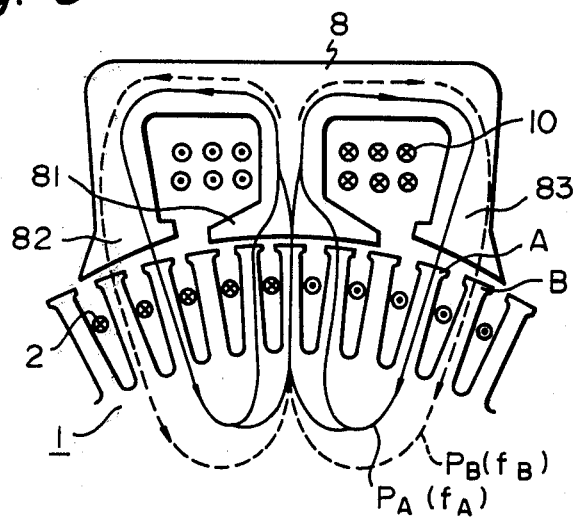
FIG. 3 is a partial cross sectional view which illustrates a part of a direct current motor according to the present invention.

FIG. 3 illustrates a part of a DC motor having E-shaped interpoles which is an embodiment of the present invention. The same parts appearing in FIG. 3 as appear in FIG. 1 or FIG. 2 are designated by the same reference numerals and a detailed explanation therefor is omitted herein. In the DC motor according to the present invention, the E-shaped interpole 8 which faces the armature 1 comprises a center pole 81, side poles 82 and 83, and an interpole winding 10 wound on the center pole 81. The interpole winding 10 is connected in series with an armature windings 2 wound on the armature 1, and an armature current passes through the armature windings 2 and the interpole winding 10 in the direction shown in FIG. 3. The gap between the outer circumference of the armature 1 and the end surface of each of the side poles 82 and 83 of the E-shaped interpole 8 is tapered, that is, the length of the gap between the outer circumference of the armature 1 and the end surface each of the side poles 82 and 83 increases from the portion which is remote from the center pole 81 to the portion which is adjacent to the center pole 81. Therefore, the width of the gap between the end surface of a tooth A of the armature 1 and the end surface of the side pole, for example, 83 is larger than the width of the gap between the end surface of a tooth B of the armature 1 and the end surface of the side pole 83. In this case, the tooth A is at the position adjacent to the center pole 81 and faces the portion of the end surface of the side pole 83 which is adjacent to the center pole 81, and on the other hand the tooth B is at the position remote from the center pole 81 and faces the other portion of the end surface of the side pole 83 which is remote from the center pole 81. In FIG. 3, the width of the gap between the outer circumference of the armature 1 and the end surface of the side poles 82 and 83 changes continuously linearly or non-stepwisely. However, it should be noted that the width of the above-mentioned gap can also be changed stepwisely.

Figures 4A, 4B:
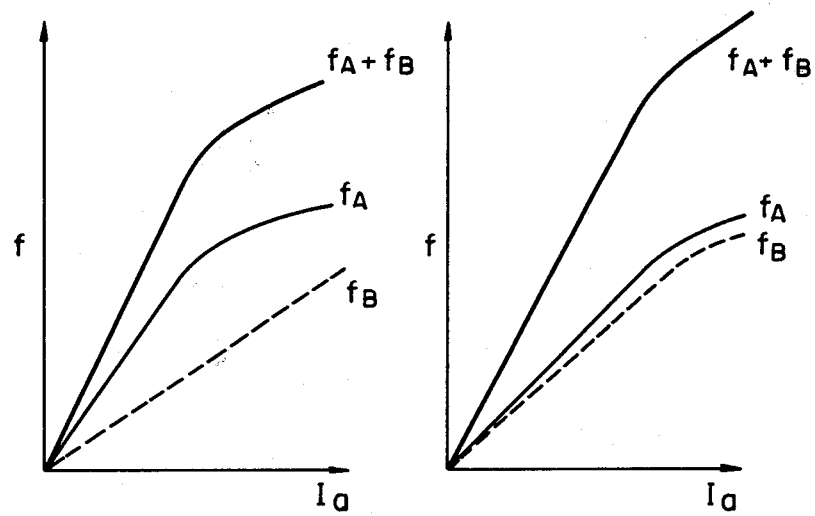
FIGS. 4A and 4B are graphs illustrating the relations between the magnetic flux for commutation and the armature current, respectively, in FIG. 2 and FIG. 3.

With reference to FIG. 3 and FIG. 4B, the reason why the linearity of the magnetic flux for commutation is ensured in a wide range of the armature current in the present invention will be explained hereinafter. In the magnetic circuit composed of the E-shaped interpole 8 and the armature 1 as shown in FIG. 3, the magnetic flux produced by the armature windings 2 which face the E-shaped interpole 8 is added to the magnetic flux produced by the interpole winding 10 in an opposite direction. The magnetic flux produced by the interpole winding 10 is larger than that produced by the armature windings 2 which face the E-shaped interpole 8. As a result, the magnetic flux for commutation is produced in the same direction as that of the magnetic flux produced by the interpole winding 10, as shown by arrows in FIG. 3. The quantity of the magnetic flux for commutation is equal to the difference of the quantity between the magnetic flux produced by the interpole winding 10 and the magnetic flux produced by the armature windings 2 which face the E-shaped interpole 8. The magnetic flux for commutation passes the above-mentioned magnetic circuit separately through the left half and the right half thereof. Half of the magnetic flux for commutation which passes, for example, through the right half of the above-mentioned magnetic circuit passes separately through the magnetic circuit $P_A$ which contains the tooth A of the armature 1 and the magnetic circuit $P_B$ which contains the tooth B of the armature 1. In this case, the gap between the end surface of the tooth A and the end surface of the side pole 83 of the E-shaped interpole 8 is larger than the gap between the end surface of the tooth B and the end surface of the side pole 83 of the E-shaped interpole 8, as aforementioned. Therefore, the magnetic reluctance of the magnetic circuit $P_A$ which contains the tooth A is larger than the magnetic reluctance of the magnetic circuit $P_B$ which contains the tooth B. Accordingly, the quantity of the magnetic flux $f_A$ which passes through the magnetic circuit $P_A$ is relatively decreased and the quantity of the magnetic flux $f_B$ which passes through the magnetic circuit $P_B$ is relatively increased. To this end, the difference between the amount of each magnetic flux for commutation $f_A$ and $f_B$ which pass through respective teeth A and B of the armature is decreased. The inclination of the gap between the outer circumference of the armature 1 and the end surface of the side pole 83 can be selected to a predetermined value so that the quantity of the magnetic flux $f_A$ and the quantity of the magnetic flux $f_B$ can be nearly equal to each other. As a result, according to the increase of the armature current $I_a$, the amount of the magnetic flux $f_A$ and $f_B$ increase with nearly the same increment as shown in FIG. 4B, and saturate nearly at the same value of the armature current $I_a$. Therefore, the teeth of the armature 1 do not saturate magnetically until a relatively large value of the magnetic flux for commutation is reached, i.e. until a relatively large value of the armature current $I_a$ is reached. To this end, the linearity of the magnetic flux for commutation is obtained in a wide range of the armature current.

In FIG. 3, the number of the teeth of the armature 1 which face the end surface of each of the side poles 82 and 83 of the E-shaped interpole 8 is two. However, this number can be more than two, and it will be understood that in such a case the characteristics of the magnetic flux for commutation with regard to the armature current can be the same as the above-mentioned embodiment.

Figure 5:
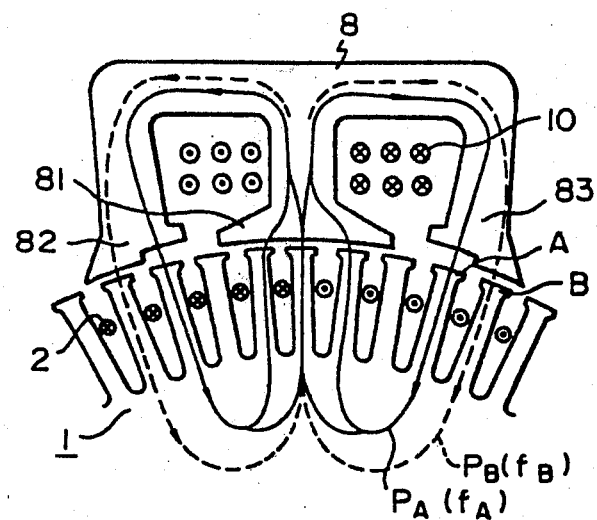
FIG. 5 is a partial cross-sectional view of another embodiment of the present invention.

In FIG. 5, the ends of the side poles 82 and 83 are stepped, to thereby form a stepwise gap between the side poles and the outer circumference of the armature 1.

Although a particular embodiment has been shown and described, it will be understood that other embodiments and modifications will occur to those of ordinary skill in the art and such embodiments and modifications fall within the true spirit and scope of the invention as set forth in the appended claims.

What is claimed is:

1. A direct current motor comprising, an armature having armature windings wound thereon and rotating around the central axis thereof, a plurality of main magnetic poles disposed around said armature having field windings wound thereon, and a plurality of E-shaped interpoles disposed at an intermediate position along the outer circumference of said armature between the adjacent main magnetic poles, with a gap being formed between the outer circumference of said armature and said interpoles, each of said E-shaped interpoles consisting of a center pole having an interpole winding wound thereon and two side poles, characterized in that the width of the gap between the outer circumference of the armature and the end surface of each of said side poles increases from the portion of said gap which is remote from said center pole to the portion of said gap which is adjacent to said center pole.

2. A direct current motor as set forth in claim 1 wherein the width of the gap varies continously.

3. A direct current motor as set forth in claim 1 wherein the width of the gap varies in a stepwise manner.

* * * * *